United States Patent [19]
Grimm et al.

[11] Patent Number: 5,605,196
[45] Date of Patent: Feb. 25, 1997

[54] MULTI-PIECE SUBSOILER UNIT FOR AN AGRICULTURAL IMPLEMENT

[75] Inventors: William L. Grimm, Wheaton; Austin W. Lutz, Jr., Woodridge, both of Ill.

[73] Assignee: Case Corporation, Racine, Wis.

[21] Appl. No.: 413,599

[22] Filed: Mar. 30, 1995

[51] Int. Cl.⁶ ................................. A01B 61/04
[52] U.S. Cl. .................... 172/266; 172/699; 172/700
[58] Field of Search ..................... 172/266, 699, 172/700

[56] References Cited

U.S. PATENT DOCUMENTS

| | | |
|---|---|---|
| 670,017 | 3/1901 | Gilman et al. . |
| 750,985 | 2/1904 | Lane . |
| 774,324 | 11/1904 | Hill et al. . |
| 1,169,879 | 2/1916 | Smith et al. . |
| 1,170,795 | 2/1916 | Beutell ............................ 172/699 |
| 1,172,553 | 2/1916 | Pistek et al. . |
| 1,255,442 | 2/1918 | Lawford . |
| 1,603,486 | 10/1926 | Mock . |
| 1,769,545 | 7/1930 | Pence . |
| 1,982,746 | 12/1934 | Kovar . |
| 2,034,229 | 3/1936 | Davis . |
| 2,034,461 | 3/1936 | Daughtery . |
| 2,699,104 | 1/1955 | Jaeger . |
| 3,002,574 | 10/1961 | Padrick ............................ 172/699 |
| 3,171,500 | 3/1965 | Dils, Jr. ........................... 172/700 |
| 3,959,901 | 6/1976 | Klett .............................. 172/699 X |
| 4,161,986 | 7/1979 | Ward ................................. 172/266 |
| 4,201,142 | 5/1980 | Stump ........................... 172/699 X |
| 4,249,615 | 2/1981 | Friggstad ......................... 172/266 |
| 4,269,274 | 5/1981 | Robertson et al. ............... 172/699 |
| 4,312,407 | 1/1982 | Crosby ......................... 172/266 X |
| 4,331,204 | 5/1982 | White ............................... 172/70 |
| 4,457,381 | 7/1984 | Wetmore .......................... 172/722 |
| 4,538,689 | 9/1985 | Dietrich, Sr. ..................... 172/700 |
| 4,609,051 | 9/1986 | Good ............................... 172/266 |
| 4,616,580 | 10/1986 | Moore et al. ................ 172/699 X |
| 4,618,006 | 10/1986 | Cosson ............................. 172/699 |
| 4,703,810 | 11/1987 | Meiners ........................... 172/178 |
| 4,787,564 | 11/1988 | Tucker . |
| 4,865,132 | 9/1989 | Moore, Jr. ................... 172/266 X |
| 4,932,478 | 6/1990 | Jones ................................ 172/699 |
| 5,001,995 | 3/1991 | Mikkelsen ........................ 111/124 |
| 5,103,918 | 4/1992 | Puntoni ............................ 172/699 |
| 5,119,888 | 6/1992 | Hall ................................. 172/699 |
| 5,183,518 | 2/1993 | Radon . |
| 5,303,780 | 4/1994 | Evenson ........................... 172/509 |
| 5,333,694 | 8/1994 | Roggenbuck et al. ....... 172/266 X |

OTHER PUBLICATIONS

Eight-page DMI sales brochure Form No. 1552-5A undated.

Primary Examiner—Terry Lee Melius
Assistant Examiner—Christopher J. Novosad
Attorney, Agent, or Firm—John W. Harbst

[57] ABSTRACT

An agricultural implement that includes a plurality of ground penetrating units for shattering the hard pan in a relatively wide pattern as the implement is drawn across the field while causing minimum disturbance to the top surface of the ground. Each ground penetrating unit includes a depending shank with a three piece plow point assembly releasably and symmetrically connected to a forward projecting lower end of the shank. The plow point assembly includes a shoe with first and second vanes attached to the shank rearwardly of a rear surface of the shoe and diverging outwardly from opposite sides of the shank. The shoe and vanes of each plow point assembly are separately and releasably attached to the shank such that any one component of the plow point assembly can be repaired or replaced independent of the other components. Each vane is pivotally fastened to the shank such that a blade portion of the vane can be angularly adjusted relative to upwardly sloping top surface of the shoe to control the degree of lifting force imparted to the ground as the implement is drawn across the field. The shank of each ground penetrating unit is specifically configured to maintain the plow point assembly in the ground.

24 Claims, 6 Drawing Sheets

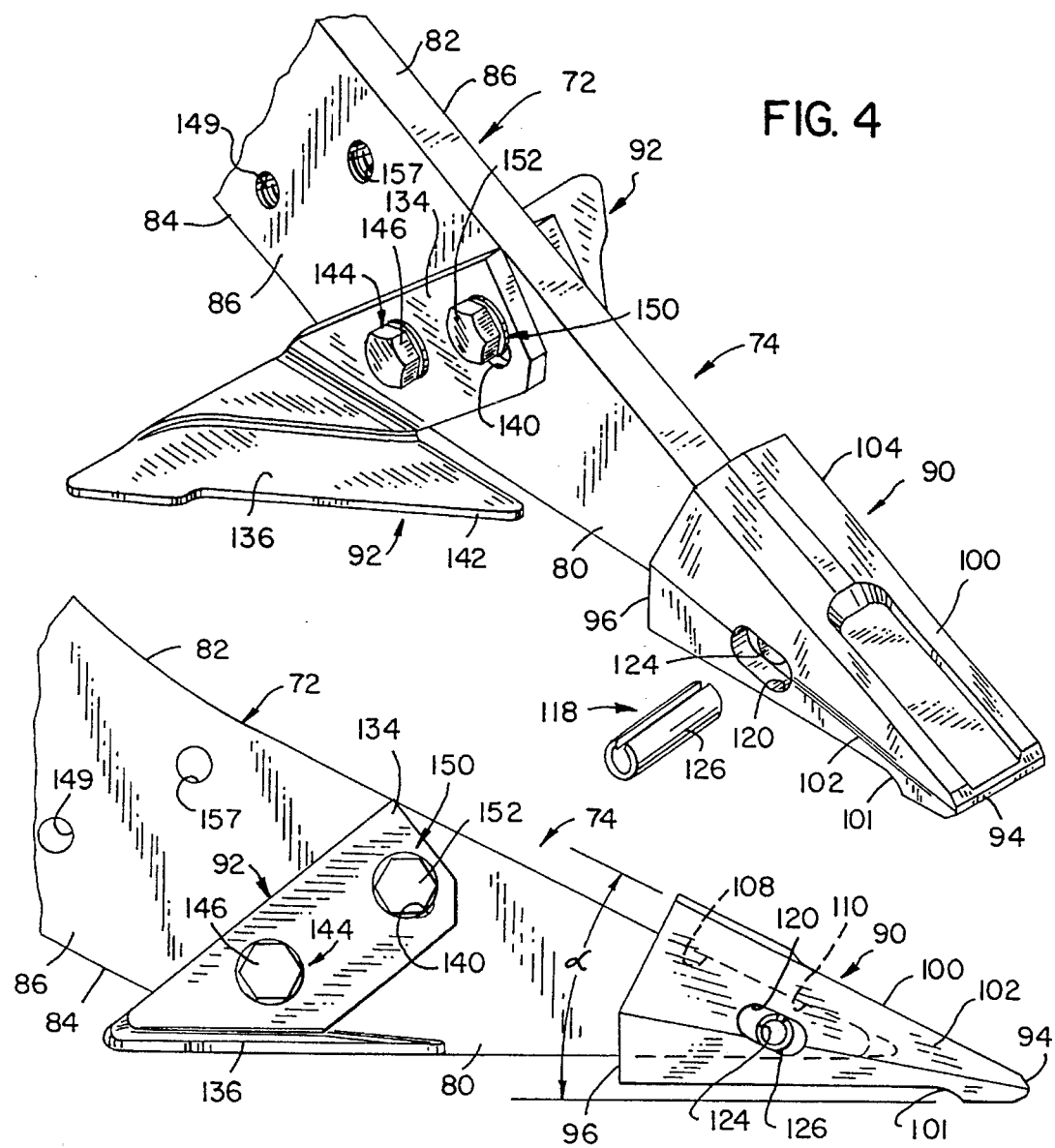
FIG. 4
FIG. 6
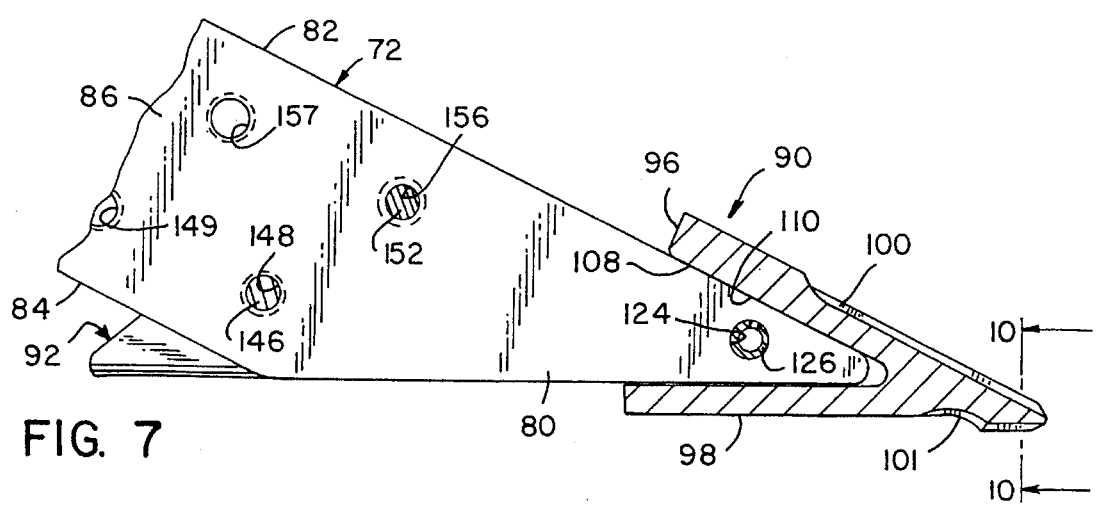
FIG. 7

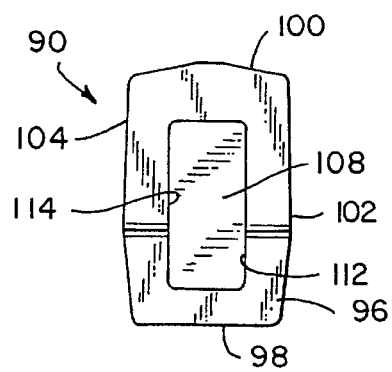
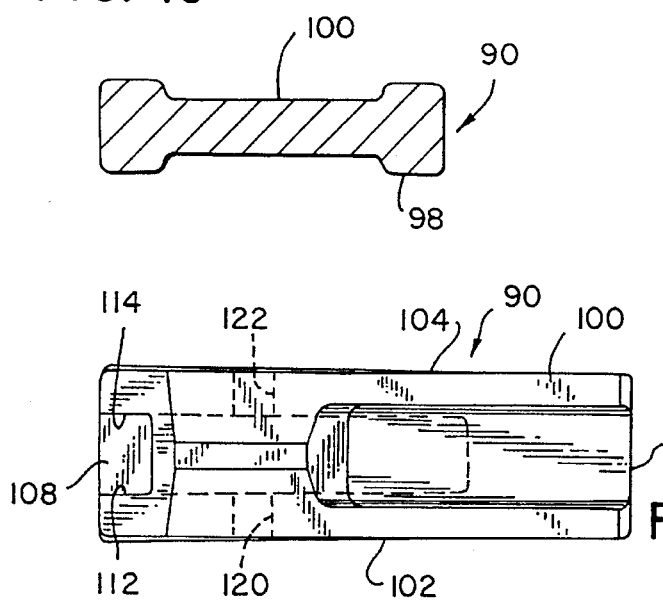
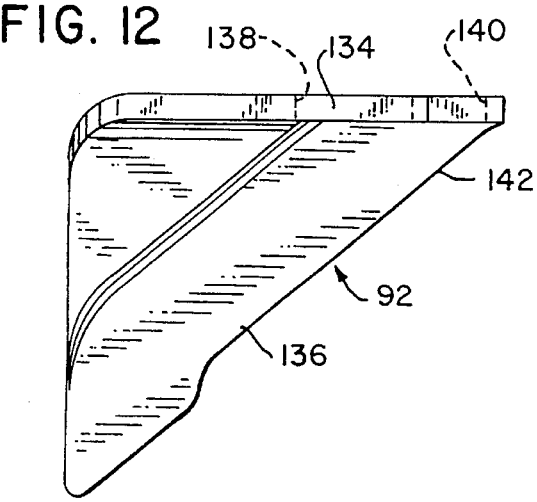
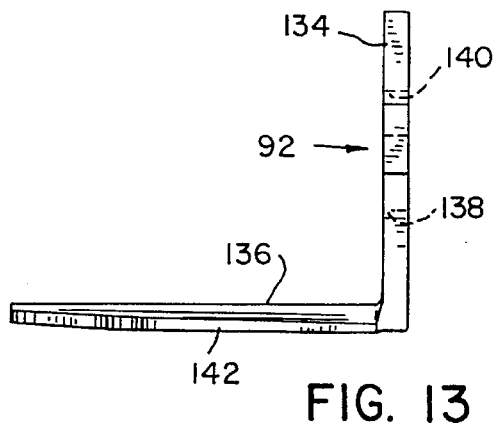
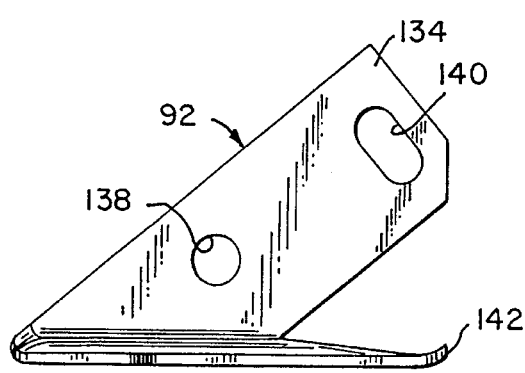

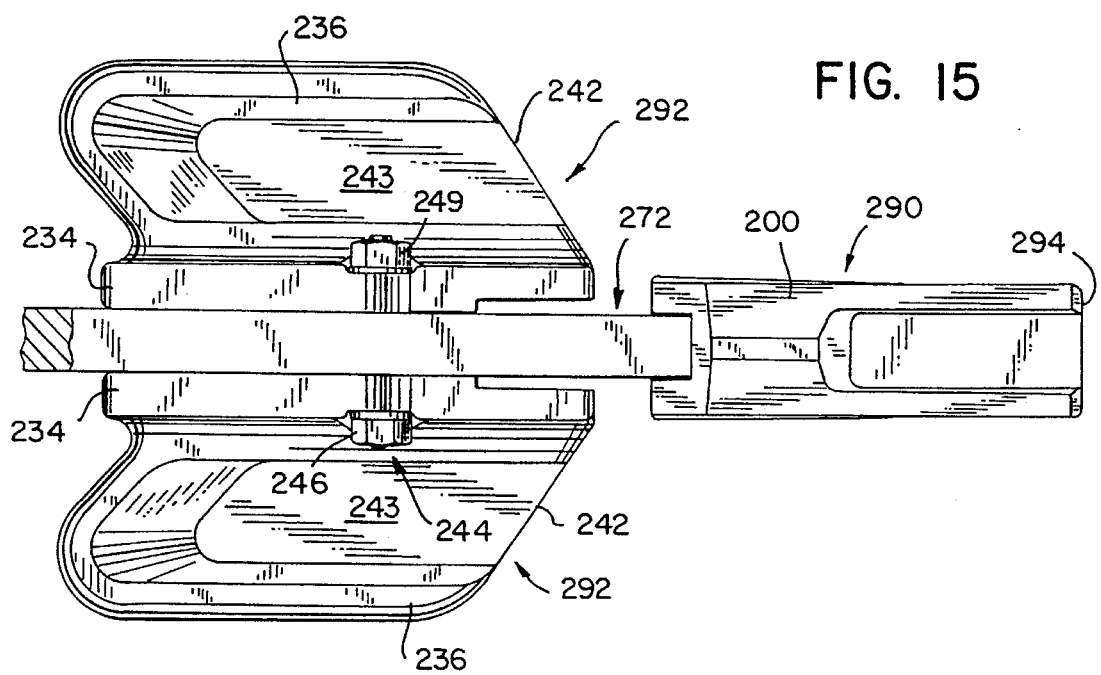
FIG. 15
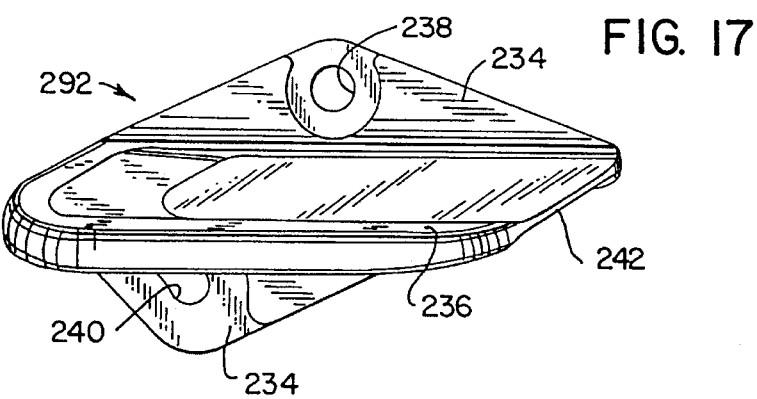
FIG. 17
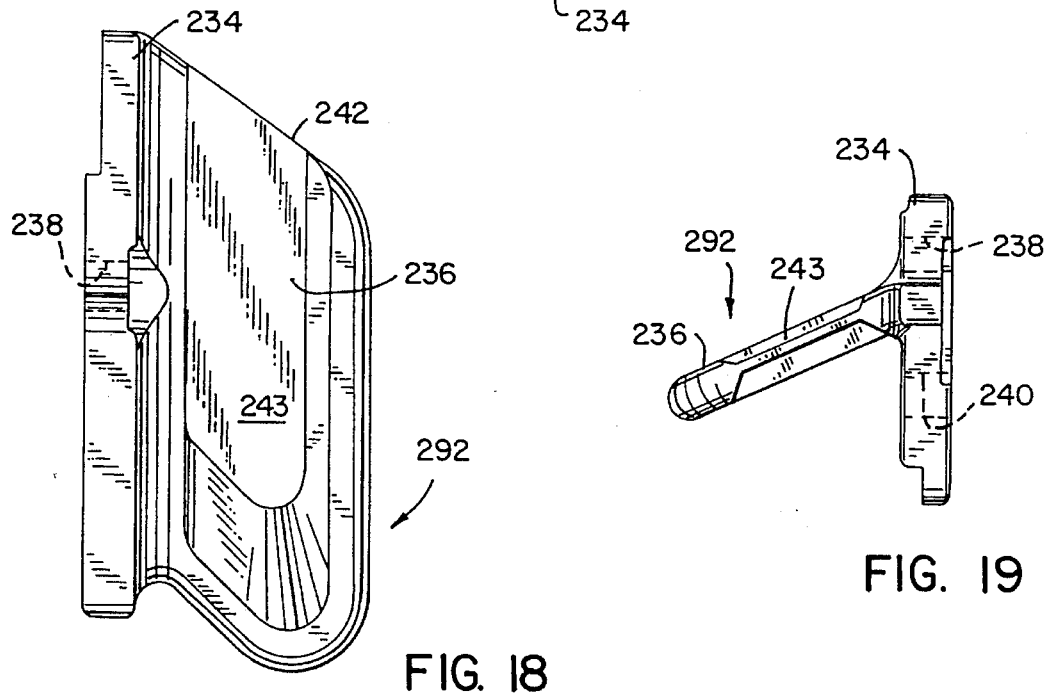
FIG. 18
FIG. 19

5,605,196

MULTI-PIECE SUBSOILER UNIT FOR AN AGRICULTURAL IMPLEMENT

FIELD OF THE INVENTION

The present invention generally relates to agricultural or farm implements and, more particularly, to a multi-piece subsoiler plow unit for a farm implement.

BACKGROUND OF THE INVENTION

Agricultural or farm implements of various types have been used throughout the years to loosen the soil or ground. Following a harvest of crop materials, it is well known that a tractor or other suitable off-highway machine draws a plowing implement across a field. Such a plowing implement or system typically comprises a series or gang of moldboard plows that condition the field as they are drawn thereacross. Each moldboard plow operates at about 8 or 10 inches below the ground surface. As the plow is drawn across the field, a strip of ground is turned over onto a furrow formed by a previous pass of the plow system.

When a moldboard plow is used repeatedly to condition the field at the same depth, a layer of highly compacted soil is formed beneath the surface. Continuous passes of the tractor or other off-highway machine across the field exacerbates soil compaction. As will be appreciated by those skilled in the art, flood irrigation techniques and heavy rains furthermore tend to compact the soil. That area of compacted soil or ground beneath the upper surface is commonly referred to, and will be referred to herein, as "hard pan." The disadvantage of a hard pan area in the field is that, due to its compaction, roots of plants have difficulty in penetrating the ground beneath the hard pan. Also, rain water has a tendency to drain over and across the hard pan rather than being absorbed into the ground.

Besides creating a hard pan, a potential disadvantage associated with moldboard plowing results because when the ground is completely turned over, the overturned soil is exposed to erosion due to wind and water flow. Accordingly, and in those situations where it is applicable, some farmers have abandoned moldboard plowing. In parts of the country, it has been found that it is not essential to turn the soil by means of conventional plowing. Because relatively large and relatively heavy off-highway machines continue to be drawn across the field, however, the problem of soil compaction or hard pan remains. As mentioned above, flood irrigation techniques and heavy rains tend to add to soil compaction problems.

Various deep tillage implements have been devised as a solution to the hard pan problem. Such implements, commonly referred to as subsoiler units are drawn behind the tractor and through the ground at a sufficient subsoiling depth to break up or shatter the hard pan thereby allowing water and air to readily penetrate the ground instead of merely running off the hard pan. The presence of subterranean rocks and roots, however, create other problems for the subsoiler units.

A conventional subsoiler unit includes a vertically elongated support or shank having an upper end connected to a tool bar assembly with a point assembly attached to a lower end thereof. A typical point assembly for a subsoiler unit includes a unilateral structure comprised of a ground breaking tooth that connects to an projects forwardly from the lower end of the support with integral wings transversely extending from opposite sides of the tooth.

Besides the inherent breakage problems that result when the point assembly engages a subterranean rock or root, conventional point assemblies are not long lasting because of rapid and extensive wear immediately behind and for a considerable distance rearwardly of the leading cutting edges as well as in other areas such as along the sides of the tooth and the leading and transverse faces of the wings. Similar wear problems are presented for the supports upon which the point assemblies are mounted especially on their front surfaces which immediately contact the ground as the subsoiler unit is pulled across the field.

Because of its subterranean operation, the operator of the implement cannot always timely appreciate when the point assembly has been dulled or even broken. As will be appreciated, as the point assembly wears or becomes blunt from breakage, the draft forces applied to the off-highway machine are significantly increased thus increasing the power requirements and energy required to pull the implement across the field.

Thus, there is a need and a desire for a subsoiler plow unit that performs a relatively wide ground shattering pattern in the subsoil to provide extensive and even distribution of plant nutrients, while promoting root growth of the plants and at the same time will be reasonable in its power requirements.

SUMMARY OF THE INVENTION

In view of the above, and in accordance with the present invention, there is provided a farm or agricultural implement that includes a plurality of ground penetrating units for shattering the hard pan in a relatively wide pattern as the implement is drawn across a field while causing minimum disturbance to the top surface of the ground. Each ground penetrating unit includes a generally vertical support member with a plow point assembly connected to a lower end thereof. According to one aspect of the present invention, each plow point assembly is of three piece construction and is arranged symmetrically relative to the support member. More specifically, each multi-piece plow point assembly comprises a shoe that is releasably connected to the support member, with first and second vanes releasably connected to and extending from opposite sides of the support member. The vanes extend in opposite directions away from the support to significantly widen the ground shattering area as the plow point assembly is pulled across the field. Notably, the shoe and each vane are independently and releasably attached to the support member with both vanes being connected to the support member rearwardly of a rear surface on the shoe.

The shoe of the preferred plow point assembly releasably fits about and extends forwardly and downwardly from the lower end of the support member and has a transverse ground engaging point at its foremost end, a generally vertical surface at its rear end, and an upwardly inclined top surface extending rearwardly from the point. The top surface of the shoe is inclined to set an optimal included angle between the top surface of the shoe and the ground surface passing beneath the plow point assembly as the implement is drawn across the field.

According to one aspect of the present invention, the shoe of the plow point assembly preferably defines a blind cavity that opens to the rear surface of the shoe. The cavity is configured to accommodate a lengthwise portion of the distal end of the support member therewithin. In addition to those characteristics described above, the shoe defines a pair of opposed outer side surfaces that are transversely spaced apart a greater distance that the width of the support member. Moreover, the shoe defines a pair of opposed and generally parallel inner surfaces that partially define the cavity that accommodates a least a lengthwise portion of the distal end of the support member. In a most preferred form of the invention, the shoe is formed from a suitable metal alloy such as white iron to enhance the wearability of the shoe during operation of the farm implement.

In a preferred form of the present invention, a bottom or underside of the shoe has a relief area disposed rearwardly of and for providing soil or ground clearance behind the ground engaging point. In a most preferred from of the invention, and between the outer side edges thereof, the underside of the shoe has a generally convex configuration. Thus, as the underside of the shoe wears, the ground engaging point on the shoe is naturally sharpened by the abrasiveness of the ground passing thereunder thus enhancing the ability of the shoe to move or break through the compacted soil.

Each vane of the preferred plow point assembly includes an attachment portion and a blade portion. The attachment portion is pivotally attached to the support member to allow for angular movement of the blade portion of the vane relative to the top surface of the shoe. A fastener releasably secures the respective vane to the support member thereby securing the blade portion at a selected angular orientation relative to the top surface of the shoe to impart a desired lifting force to the ground shattered by the point as the implement is drawn across the field.

When fastened to the support member, the attachment portion of each vane extends generally vertical and parallel to a generally planar side surface of the support member. In a most preferred form of the invention, the attachment portion of each vane defines an aperture that allows a pivot member to pass therethrough defining a generally horizontal axis about which the vane pivots. The attachment portion of each vane further includes an elongated slotted opening or aperture through which the fastener passes to secure the vane to the support member. Notably, the elongated slot in the attachment portion of the vane defines stops at opposite ends thereof for limiting the angular displacement of the blade portion of the vane relative to the top surface of the shoe.

In one form of the invention, the blade portion of each vane extends generally normal to the attachment portion and transversely away from a respective side surface on the support member. Also, and besides being disposed rearwardly of the rear surface of the shoe, a leading edge of the blade portion of each vane is slanted back at an angle in excess of 30 degrees relative to a vertical plane passing transversely relative to the direction of travel of the plow point assembly through the ground to reduce the draft forces being imparted by the ground penetrating unit to the tractor.

In a second form of the invention, the blade portion of each vane extends transversely away from that location where it is joined to the respective attachment portion to a location outward and downward thereof. In this embodiment, the blade portion of each vane serves to raise and slightly twist the broken deep soil as the ground penetrating is pulled across the field. The leading or cutting edge of this second embodiment of a vane is likewise slanted back at an angle in excess of 30 degrees relative to a vertical plane passing transversely relative to the direction of travel of the plow point assembly through the ground to reduce the draft forces being imparted by the ground penetrating unit to the tractor.

An upper end of the support member of each ground penetrating unit is connected to a transversely extended tool bar assembly. Thus, a plurality of ground penetrating units can be arranged on the tool bar assembly in transversely spaced relation relative to each other. As will be appreciated, the transverse spacing between adjacent ground penetrating units can be adjusted as desired to accommodate different transverse spacings between plant rows.

In one form, the upper end of the support member of each ground penetrating unit can be rigidly secured to the tool bar in a conventional and well known manner. According to the present invention, the support member is specifically configured to maintain the ground penetrating unit in the ground as the farm implement is drawn across the field. Testing has revealed that providing the support member with a generally semi-parabolic shape between upper and lower ends thereof is an advantageous support member profile that promotes ground engagement of the plow point assembly.

According to another aspect of the present invention, an upper end of each support member is connected to the tool bar with a spring biased linkage assembly that normally maintains the subsoiler unit in an operational position while allowing vertical displacement of the plow point assembly in response to abnormally high draft forces being applied thereto, i.e., when the plow point assembly engages with a root or large rock. The spring biased linkage assembly preferably comprises at least upper and lower links pivotally connected to and disposed between the support of each ground penetrating unit and the tool bar: The upper and lower links are of substantially equal length and are arranged in generally parallel relationship relative to each other. In a most preferred form the invention, the upper link of the linkage assembly is comprised of two pivotally interconnected toggle elements that are movable between collapsed and non-collapsed positions relative to each other. The linkage assembly further includes a spring mechanism connected to the upper link for normally holding the toggle elements of the upper link in non-collapsed relation relative to each other thus maintaining the respective plow unit in ground engaging relation during operation of the farm implement.

When the support member is connected to the tool bar assembly with a spring biased linkage assembly, testing has revealed that it is advantageous to configure the lower end of the support member and the top inclined surface of a plow point shoe such that an optimum included angle ranging between about 31 degrees to about 35 degrees is defined between the top inclined surface of the shoe and a horizontal plane passing beneath the point on the shoe. In a most preferred form of the invention, the optimum included angle of the top surface of the shoe relative to the ground passing beneath the shoe is about 31.5 degrees.

Each ground penetrating unit preferably includes a bar carried by and the advance of the support member for reducing wear of the support member. In accordance with the present invention, a vertically elongated wear bar is provided adjacent to and parallels a front edge of the support member. The wear bar extends substantially the length of the front edge of the support member. Accordingly, as the ground penetrating unit is drawn through the field, the wear bar engages the ground in advance of the support member thereby prolonging the useful life thereof. Understandably, the wear bar is preferably formed of a suitable metal alloy that resists wear.

As each ground penetrating unit is drawn through the ground, it advantageously shatters the hard pan while minimally disturbing the top surface of the ground. As will be appreciated, shattering of the hard pan enhances root growth and promotes water absorption while allowing the ground to become worked by the winters freezing and thawing cycles. Preferably, the shoe of the plow point assembly is formed from a suitable metal alloy that promotes and prolongs its useful life.

According to one embodiment of the invention, the plow point assembly is advantageously constructed and designed to allow independent and separate attachment of the shoe and each vane to the support member. Independent attachment of the vanes to the support member allows the blade portions of the vane to be selectively adjusted relative to the top surface of the shoe thus customizing each plow point assembly to the particular field conditions where the plow point assembly is to be used. Moreover, independent attachment of the vanes to the support member allows the vertical spacing between the vanes and the shoe to be modified, thus, changing the effectiveness and operation of the plow point assembly as desired by the particular operation of the implement.

Another advantage of the present invention is the manner by which the plow point assembly is maintained in engagement with the ground surface to break the hard pan. In one form of the invention, the support member of each ground penetrating unit has a semi-parabolic shape such that the plow point is advantageously disposed relative to the ground as the implement is drawn across the field.

In another form of the invention, a linkage assembly is disposed between the upper end of the support member and the tool bar assembly to which each ground penetrating unit is attached. The linkage assembly is specifically designed such that upon engagement of a subterranean rock or root, a plow point connected to the lower end of the support member is permitted to be vertically displaced thereby inhibiting damage to the multiple component parts of the plow point assembly. After the plow point passes over the subterranean rock or root, the spring biased linkage assembly forcibly returns the ground penetrating unit to its normal operating position. Additionally, the configuration of the support member for each ground penetrating unit preferably promotes maintaining the plow point assembly in ground engagement as the penetrating unit is drawn across the field.

While a spring biased relief system is preferred, the advantages of a multi-piece plow point assembly construction is equally valuable on those ground penetrating units wherein the support member is rigidly connected to the tool bar assembly because subterranean rocks and roots are not a significant concern. Because each of the component parts of the plow point assembly are independently attached to the support member, significant wear on any one component part can be addressed by replacing only that component part rather than the entire of the plow point assembly. Moreover, the provision of a replaceable wear bar disposed along a front edge of a support member can be expected to prolong the useful life of the ground penetrating unit.

These and other objects aims and advantages of the present invention will become readily apparent from the following detailed description, the detail drawings and the appended claims.

DETAILED DESCRIPTION OF THE DRAWINGS

FIG. 4 is a fragmentary perspective view of a plow point assembly forming part of the ground penetrating unit of the present invention;

FIG. 5 is a plan view of the plow point assembly illustrated in FIG. 4;

FIG. 6 is an enlarged side elevational view of the plow point assembly;

FIG. 7 is a sectional view taken along line 7—7 of FIG. 5;

FIG. 8 is a plan view of one embodiment of a shoe forming part of the point assembly;

FIG. 9 is a rear view of the shoe illustrated in FIG. 8;

FIG. 10 is an enlarged sectional view taken along line 10—10 of FIG. 7;

FIG. 11 is an enlarged side elevational view of one form of a vane forming part of the plow point assembly;

FIG. 12 is an enlarged plan view of the vane schematically illustrated in FIG. 11;

FIG. 13 is an enlarged front elevational view of the vane schematically illustrated in FIG. 11;

FIG. 15 is a plan view of the second embodiment of the plow point assembly;

FIG. 17 is an enlarged side elevational view of a vane used in combination with the second embodiment of the plow point assembly;

FIG. 18 is an enlarged plan view of the alternative vane structure illustrated in FIG. 17;

FIG. 19 is an enlarged front elevational view of the alternative vane structure illustrated in FIG. 17; and FIG. 20 is a sectional view taken along line 20—20 of FIG. 3.

DETAILED DESCRIPTION OF THE PRESENT INVENTION

Figure 1:
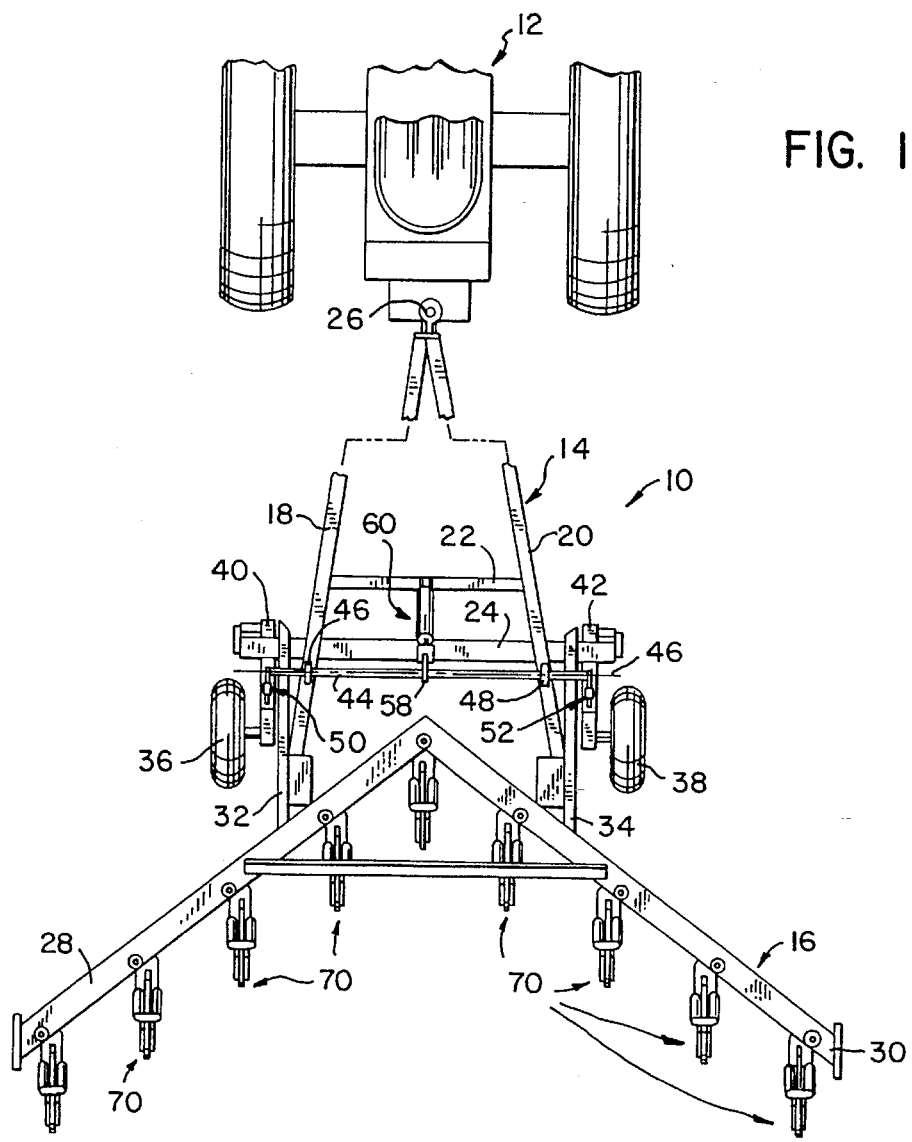
FIG. 1 is a schematic plan view of a farm implement incorporating the present invention and that is attached to a rear of a suitable off-highway machine, which is only fragmentarily shown.

While the present invention is susceptible of embodiment in various forms, there are shown in the drawings and will hereinafter be described preferred embodiments of the invention with the understanding that the present disclosure is to be considered as setting forth exemplifications of the invention which are not intended to limit the invention to the specific embodiments illustrated.

Figure 2:
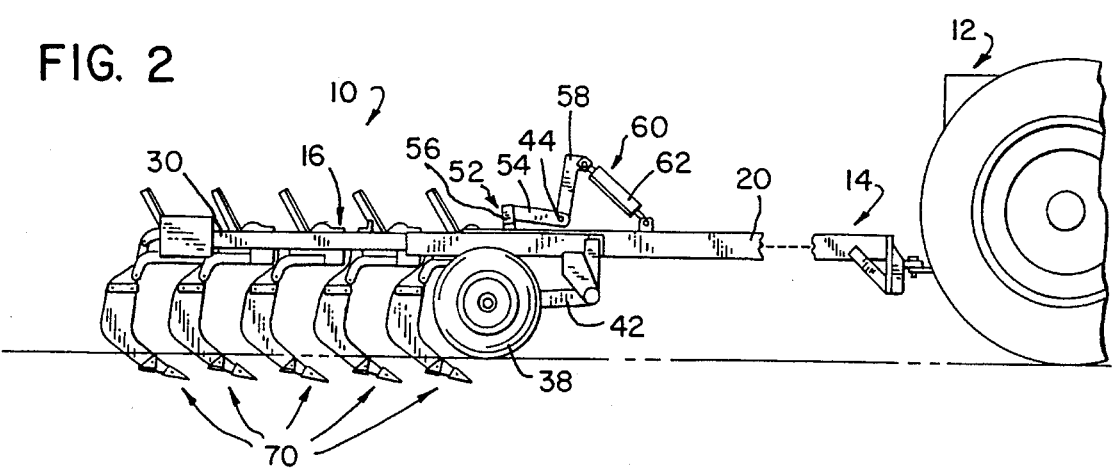
FIG. 2 is a schematic side elevational view of the apparatus of FIG. 1 in use.

Referring now to the drawings, wherein like reference numerals indicate like parts throughout the several views, in FIGS. 1 and 2 there is schematically illustrated a farm or agricultural implement that embodies features of the present invention and that is generally designated by reference numeral 10. Implement 10 is shown as being attached to and pulled behind an off-highway machine 12 such as a tractor or the like. As shown, implement 10 includes a conventional mobile frame 14 that typically includes a tool bar assembly 16.

The frame 14 can be of any suitable design. In the illustrated form, frame 14 includes fore-and-aft elongated side frame members 18 and 20 which are connected to each other by a pair of fore-and-aft spaced cross frame members 22 and 24. At their forward ends, the frame members 18 and 20 are commonly connected to the tractor 12 at a hitch point 26.

As well be appreciated by those skilled in the art, the tool bar assembly 16 may likewise take any of a variety of shapes without detracting or departing from the spirit and scope of the present invention. In the illustrated embodiment, the tool bar assembly 16 has a generally inverted V shape and includes first and second side frame members 28 and 30. The side frame members 28 and 30 of the tool bar assembly 16 are attached to the transverse cross frame member 24 of frame 14 by a pair of transversely spaced fore-and-aft extending rigid connecting members 32 and 34, respectively.

The elevation of the tool bar assembly 16 relative to the ground over which it passes is conventionally controlled by a pair of ground engaging gauge wheels 36 and 38. As shown, gauge wheels 36 and 38 have their axles journalled at the distal end of a pair of fore-and-aft extending arms 40 and 42, respectively. The opposite ends of each arm 40, 42 is pivotally connected beneath and to the cross frame member 24 of frame 14. As shown, a transversely elongated rock shaft 44 is supported for oscillating movement about a fixed axis 46 and intermediate its ends by pillow blocks 46 and 48 that are securely mounted to the side frame members 18 and 20 of frame 14. Notably, the rock shaft 44 extends above and over the connecting members 32 and 34 and over the wheel support arms 40 and 42.

Linkage assemblies 50 and 52 are operably connected to the rock shaft 44 in transversely spaced relationship relative to each other for elevationally moving the wheels 36 and 38 and thereby elevationally positioning the tool bar assembly 16 relative to the top surface of the ground over which the agricultural implement 10 moves. As is conventional, the linkage assemblies 50, 52 operate in concert with each other to raise and lower the tool bar assembly 16 generally parallel to the ground. Since linkage assemblies 50, 52 are substantially similar, only linkage assembly 52 will be described in detail.

As shown in FIG. 2, each linkage assembly 50, 52 includes a generally horizontal arm 54 that is fixedly connected to and extends radially from the rock shaft 44. Toward a distal end thereof, each arm 54 is connected to a generally vertical lift arm 56 that depends from and is connected to a respective wheel support arm. Intermediate the ends thereof, the rock shaft 44 includes a generally vertical actuator 58 that is fixedly connected to and radially extends upwardly from the rock shaft 44. Toward its distal end, actuator arm 58 is connected to a driver 60. Preferably, driver 60 is in the form of a linearly distentable/retractable hydraulic cylinder 62 having one end connected to the actuator arm 58 and an opposite end connected to the frame 14. As will be appreciated, distention/retraction of the cylinder 62 will serve to angularly displace or oscillate the rock shaft 44 about its fixed axis 46. Oscillation of the rock shaft 44 will translate into arcuate movement of the horizontal arm 54 and, thus, endwise movement of the lift arm 56 thereby displacing the respective wheel support arm and, thus, positioning the gauge wheels 36, 38 to elevationally position the tool bar assembly 16 relative to the ground surface over which it moves.

A plurality of ground penetrating units, generally indicated by reference numeral 70, are mounted on and individually connected to the tool bar assembly 16. The ground penetrating units 70 are connected to the tool bar assembly 16 with predetermined transverse spacing therebetween. Because they are each independently connected to the tool bar assembly 16, however, the transverse spacing between adjacent ground penetrating units can be readily adjusted to accommodate the desired operation. The ground penetrating units 70 are substantially similar to each other and thus, only one ground penetrating unit will be described and discussed in detail.

Figure 3:
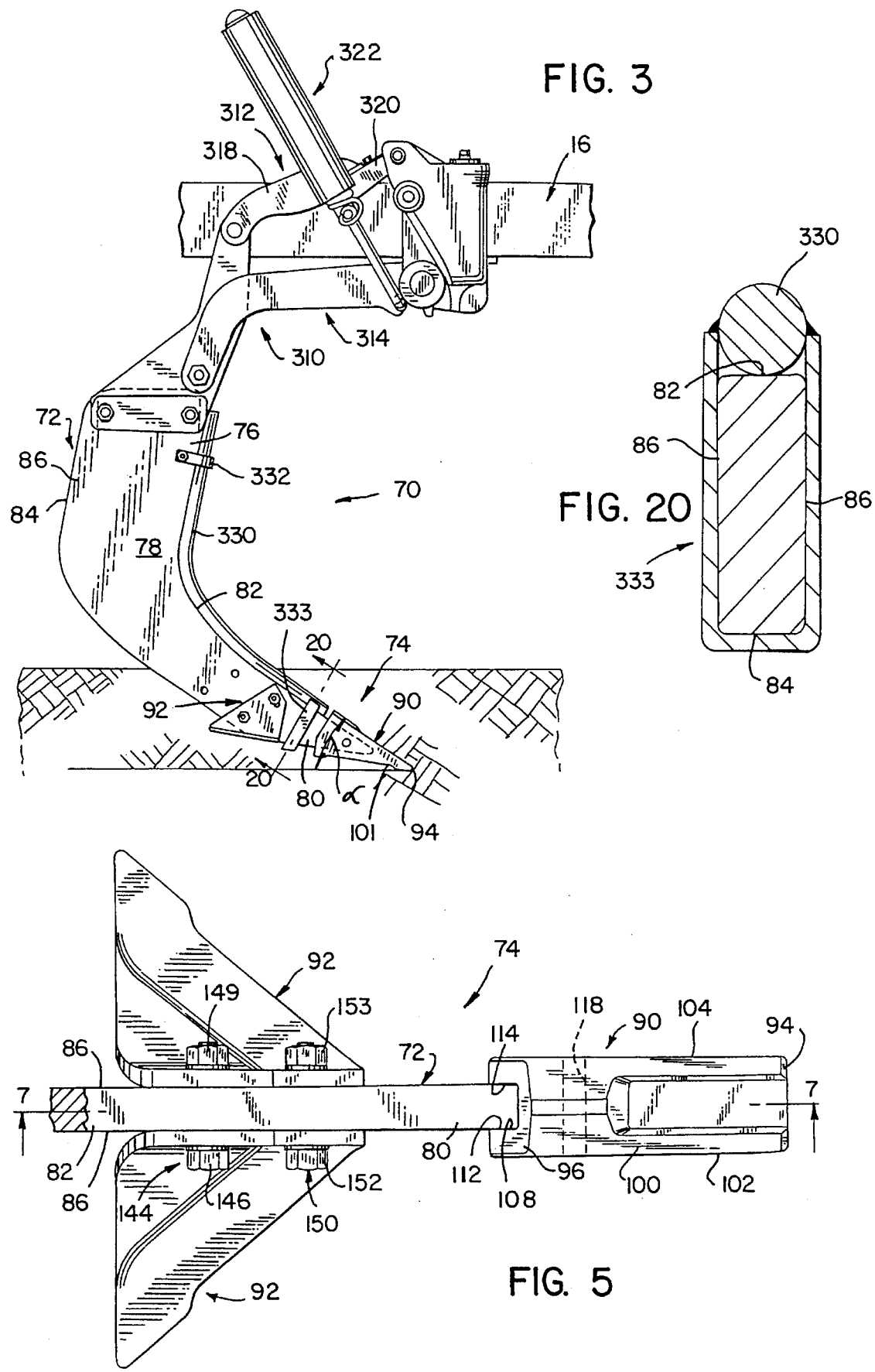
FIG. 3 is an enlarged side elevational view of a ground penetrating unit according to the present invention.

Each ground penetrating unit 70 is adapted to perform a subsoiling operating as it is drawn through the ground with minimum disturbance to the ground surface. Turning now to FIG. 3, each ground penetrating unit 70 comprises a rigid generally vertical support member 72 that is operably connected at a upper end to the tool bar assembly 16 and has a plow point assembly 74 connected to an projecting from a lower end thereof. Each support member 72 is of rigid construction and includes an upper end 76, a generally vertical intermediate section 78 that depends vertically from the upper end 76, and a forwardly and downwardly projecting lower end 80. Each support member 72 further includes a front edge or surface 82, a rear edge or surface 84, and opposed generally planar side surfaces 86 that extend the length of the support member 72. In the illustrated embodiment, each shank or support member 72 has a relatively narrow transverse thickness and a relatively wide width in a fore-and-aft direction for strength.

According to one aspect of the present invention, and as shown FIGS. 4 and 5, each plow point assembly 74 is preferably of three piece construction. In the embodiment illustrated, the multi-piece plow point assembly 74 is symmetrically arranged relative to a respective support member 72 and includes a one-piece shoe 90 that releasably fits about and extends forwardly and downwardly from the lower end 80 of a respective support member 72, and a pair of substantially identical one-piece vanes 92 releasably connected to opposite side surfaces 86 of the support member 72 such that each vane 92 transversely diverges away from a respective side of the shank or support member 72 thereby widening the shatter area of each plow point assembly 74.

As shown, each unitary shoe 90 defines a ground shattering point 94 that transversely extends across a forward end of the shoe and a generally vertical surface 96 at a rear end of the shoe 90. Shoe 90 further includes a bottom surface 98 (FIG. 7) and an upwardly inclined outer top surface 100 extending rearwardly from the point 94. Each shoe 90 further includes opposed generally vertical side surfaces 102 and 104 that extend generally parallel relative to each other and generally parallel to the respective side surfaces 86 on the support member 72.

Turning now to FIGS. 5 through 9, each shoe 90 further defines a blind cavity 108 that permits the shoe to be symmetrically arranged relative to the support member 72. As shown in FIGS. 5, 6 and 7, cavity 108 releasably accommodates a lengthwise end portion of the lower end 80 of a respective support member 72. In the illustrated embodiment, cavity 108 opens to the rear surface 96 of shoe 90. As illustrated in FIGS. 5, 8 and 9, recess 108 is partially defined by generally vertical inner side walls 112 and 114 that extend generally parallel to each other and generally parallel to the outer side walls 102 and 104 of the shoe 90. The transverse spacing between the inner side walls 112 and 114 is equal to or slightly greater than the transverse spacing between the flat side surfaces 86 of the support member 72. The remainder of the cavity 108 is configured to generally correspond to and accommodate a lengthwise end portion of the support member 72.

The shoe 90 is releasably secured to the lower end 80 of the support member 72 as with a suitable fastener 118. As illustrated in FIG. 8, shoe 90 defines a pair of transversely aligned apertures 120 and 122 that each open to cavity 108. Furthermore, the lower end 80 of support member 72 is provided with a transverse aperture 124 (FIG. 7). In the illustrated embodiment, fastener 118 includes a conventional elongated roll pin 126 that passes endwise through the apertures 120 and 122 in shoe 90 and through aperture 124 in the support member 72.

As shown in FIGS. 4, 5, and 7, the top surface 100 of shoe 90 has a changing surface configuration between the point 94 and the rear surface 96. As illustrated in FIGS. 8 and 10, the top surface 100 of shoe 90 has a generally concave surface configuration extending rearwardly from the point 94. In contrast, and as shown in FIGS. 8 and 10, the top surface 100 of the shoe 90 has a generally convex configuration extending forwardly from the rear surface 96 of the shoe 90. As will be appreciated by those skilled in the art, the changing configuration provided along the top surface 100 of the shoe 90 tends to further break up or shatter the ground passing over the shoe 90.

As schematically shown in FIGS. 4, 6 and 7, the bottom side or surface 98 of shoe 90 defines a relief area 101 disposed lengthwise proximate to but rearwardly of point 94. As schematically represented in FIG. 3, the purpose of relief area 101 is to provide a soil or ground clearance area behind the point 94 of the shoe 90 as the ground penetrating unit 70 is pulled through the ground. As schematically shown in FIG. 10, the lengthwise portion of the underside or bottom 98 of shoe 90 disposed at least between point 94 and the relief area 101 preferably has a transverse convex profile. As will be appreciated by those skilled in the art, the transverse convex profile extending across the bottom surface 98 of shoe 90 advantageously allows the point 94 of shoe 90 to become increasingly sharpened as the point 94 of shoe 90 wears from abrasions as it is drawn through the ground.

Returning to FIGS. 4, 5 and 6, each vane 92 of the plow point assembly 74 is disposed rearwardly of the rear surface 96 of the shoe 90. Moreover, vanes 92 are attached to the support member 72 independent of each other and independent of the shoe 90. The vanes 92 are substantially similar in structure relative to each other and, thus, a detailed description of only one vane 92 will be provided with the understanding that the structure of the other vane is substantially similar thereto.

FIGS. 11, 12 and 13 schematically illustrate one embodiment of the vane 92. As shown, each vane 92 includes an attachment portion 134 and a blade portion 136. The attachment portion 134 is generally planar and defines a hole 138 and an elongated slot 140 radially spaced from the hole 138. A portion or segment of the inboard end of the blade portion 136 of each vane 92 is rigidly attached to the attachment portion 134. In the illustrated embodiment, the blade portion 136 extends generally normal to and diverges transversely away from the attachment portion 134. The top surface of each blade portion 136 is preferably configured to promote the breakup of the compacted ground or soil material passing thereover as the ground penetrating unit is drawn through the ground.

To promote movement of the vane 92 through the ground while imparting minimum draft forces to the tractor, a leading edge 142 of each blade portion 136 is swept back at an angle in excess of 30 degrees relative to a vertical plane that extends transverse to the direction of movement of the vane 92 through the ground. In the illustrated embodiment, the leading edge 142 of each blade portion 136 begins at an inboard end of the blade portion 136 and slants back at a angle ranging between 45 degrees and 60 degrees relative to a line transverse of the direction of travel of the vane 92 through the soil.

Returning to FIGS. 4 and 6, each vane 92 further includes a pivot member 144 that extends generally transverse to the attachment portion 134 and defines a generally horizontal axis about which vane 92 is movable. In the illustrated embodiment, pivot member 144 includes a threaded bolt 146 that passes endwise through the hole 138 in the attachment portion 134 of each vane 92 and is threadably secured in a threaded bore 148 (FIG. 7) defined by the support member 72. Alternatively, bolt 146 can pass endwise through the support member 72 and through the aperture 138 defined in the corresponding vane 92 disposed on the opposite side of the support member 72 whereat a suitable nut 149 (FIG. 5) releasably holds bolt 146 in place.

A fastener 150 releasably secures the respective vane to the support member 172. In the illustrated embodiment, fastener 150 includes a threaded bolt 152 that passes endwise through the slot 140 in the attachment portion 134 of each vane 92 and is threadably secured in a threaded bore 156 defined by the support member 72. Alternatively, bolt 152 can pass endwise through the support member 72 and through the slotted opening 140 defined in the corresponding vane 92 disposed on the opposite side of the support member 72 whereat a suitable nut 153 (FIG. 5) releasably holds the bolt 152 in place. As will be appreciated, the opposed ends of the slot 140 in each vane combines with the threaded bolt 152 to act as a stop for limiting the range of angular movement of the blade portion 136 of a respective vane to a predetermined range of travel. Notably, however, the vane is infinitely adjustable throughout the range of movement of the blade portion 136.

As best seen in FIG. 6, when the fastener 150 is loosened, the elongated slot 140 allows the blade portion 136 of the vane 92 to be moved into a selected angular orientation relative to the top surface 100 of the shoe 90. As shown in FIG. 6, the blade portion 136 of each vane 92 is angularly adjustable between a generally horizontal position and an angularly disposed position. When the vane 92 is in a generally horizontal position, the blade portion 136 thereof extends generally parallel to the soil surface such that it serves to shatter the hard pan while providing substantially no disturbance to the top of the soil surface as the vane 92 is pulled through the ground. When the vane 92 is in an angularly adjusted position, the blade portion 136 of each vane 92 is canted angularly relative to a plane extending generally parallel to the top surface of the soil such that, as the vane is pulled through the ground, it serves to both shatter the hard pan as well as offer a degree of lift to the soil between the blade portion 136 and the top soil surface. After the angular orientation of the blade portion 136 relative to the top surface 100 of the shoe 90 has been set, fastener 150 is tightened thereby securing the vane 92 in place with the preset angular orientation of the blade portion 136 relative to the top surface 100 of the shoe 90. As will be appreciated, opposite ends of the slot 140 define stops which limit the angular orientation of the blade portion 136 of each vane 92 relative to the top surface 100 of the shoe 90.

As shown in FIGS. 4, 6 and 7, other pairs of threaded holes or apertures 149, 157 can be defined along the length of the support member 72. As will be appreciated, the threaded holes or apertures 149, 157 and others serve the same purpose as do the threaded holes or apertures 148 and 156 described above. As such, the vanes 92 can be adjusted both independently and vertically relative to the shoe 90.

Notably, however, regardless of their position along the length of the support member 72, the vanes 92 are disposed rearwardly of the rear edge or surface 96 of shoe 90.

Figure 14:
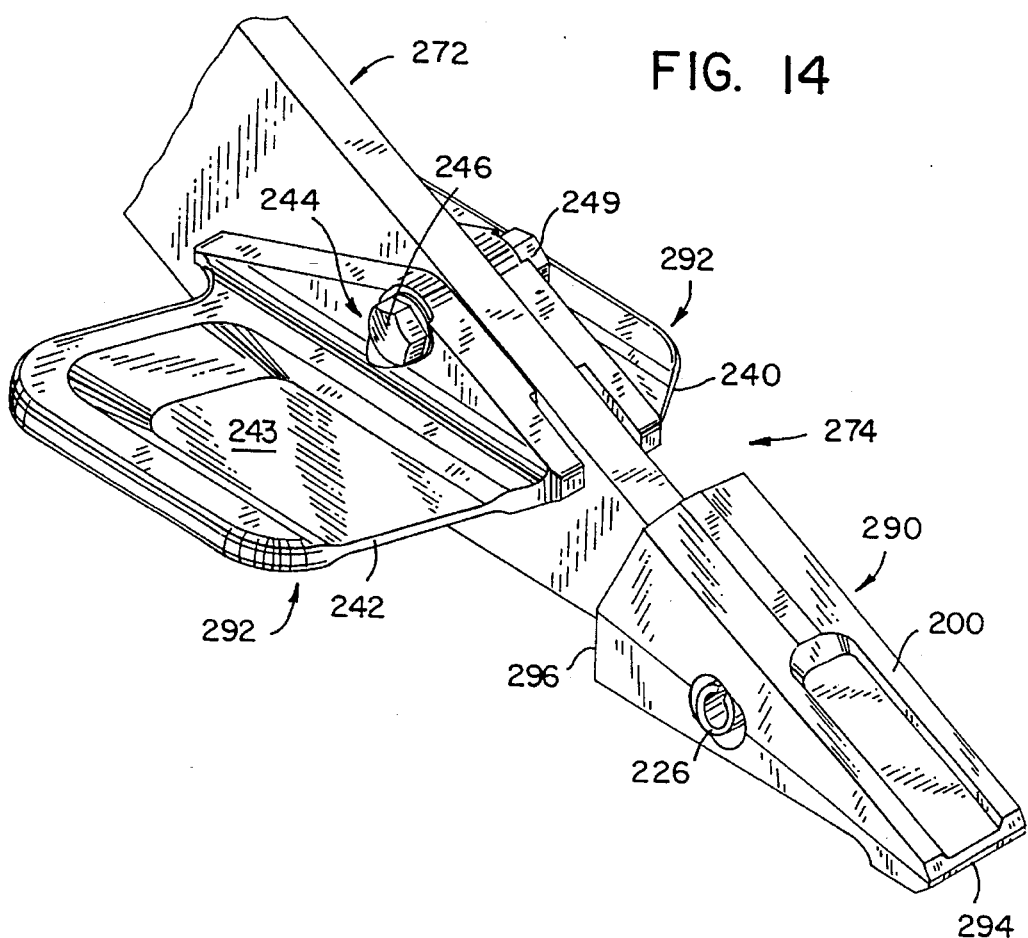
FIG. 14 is a perspective view of a second embodiment of a plow point assembly according to the present invention.
Figure 16:
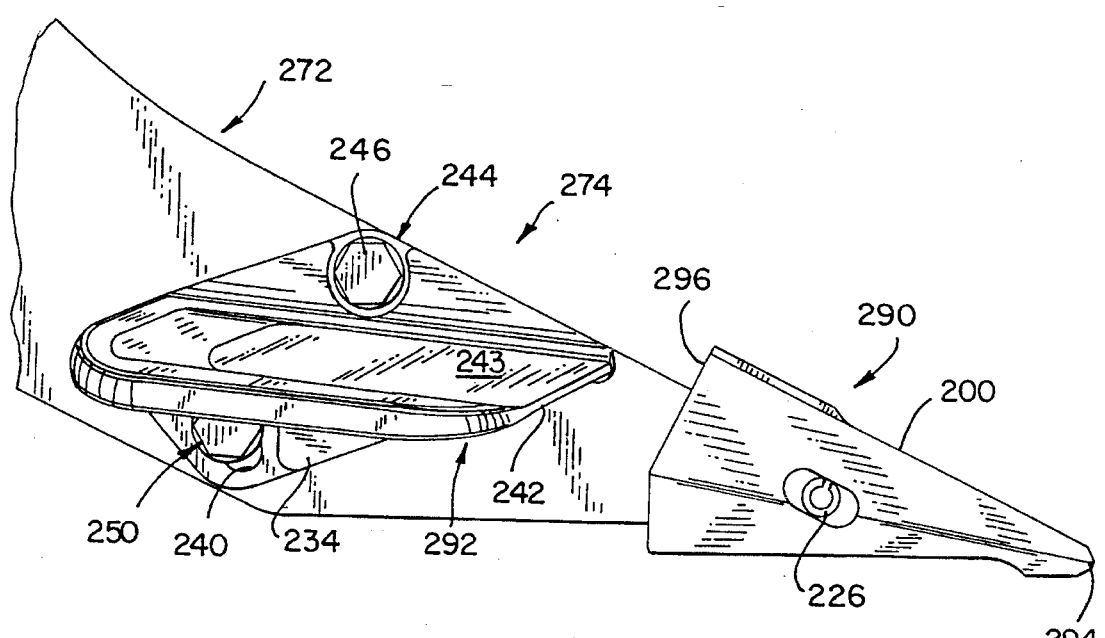
FIG. 16 is an enlarged side elevational view of the alternative embodiment of the plow point assembly illustrated in FIG. 15.

FIGS. 14, 15 and 16 schematically illustrate a second embodiment of a plow point assembly generally indicated by reference number 274. The elements of the second embodiment of the plow point assembly 274 that are identical or functionally analogous to those of the first embodiment of the plow point assembly 74 are designated by reference numerals identical to those used for the first embodiment with the exception that the second embodiment reference numerals are characterized in the two-hundred series. Plow point assembly 274 attaches to the tool bar assembly 16 as by a generally vertically support member or shank 272 that is substantially identical to support member or shank 72 discussed in detail above and, thus, no further description needs to be provided therefore.

Like plow point assembly 74, plow point assembly 274 is of multi-piece construction and includes a shoe 290 and first and second substantially corresponding vanes 292 that are all symmetrically arranged relative to the shank or support 272. Shoe 290 is substantially identical to shoe 90 discussed in detail above and thus no further description needs to be provided therefor.

As shown in FIGS. 14, 15 and 16, each vane 292 of the plow point assembly 274 is disposed rearwardly of the rear surface 296 of the shoe 290. The vanes 292 are attached to the support member 272 independent of each other and independent of the shoe 290. Like the plow point assembly 74 described in detail above, the vanes 292 of plow point assembly 294 can likewise be disposed along the length of the support member 272 in different vertical positions other than that shown while remaining rearwardly of the rear surface 296 of the shoe 290.

As shown in FIGS. 17, 18 and 19, each vane 292 includes an attachment portion 234 and a blade portion 236. The attachment portion 234 is generally planar and defines a hole 238 and an elongated slot 240 radially spaced from hole 238. In the illustrated embodiment, the inboard end or edge of the blade portion 236 of each vane 292 is rigidly attached to the attachment portion 234. As shown, the blade portion 236 transversely extends away from the attachment portion 234 to effectively widen the ground shattering area effected by the plow point assembly 274 as it is drawn through the ground.

To promote movement of each vane 292 through the ground while imparting minimal draft forces to the tractor 12, a leading edge 242 of each blade portion 236 is swept back at an angle in excess of 30 degrees relative to a vertical plane that extends transverse to the direction of movement of the vane 292 through the ground. As best illustrated in FIG. 19, the blade portion 236 of each vane 292 angles downwardly from its inboard end where it attaches to the attachment portion 234.

Returning to FIGS. 14, 15 and 16, each vane 292 further includes a pivot member 244 that extends generally transverse relative to the attachment portion 234 and defines a generally horizontal axis about which vane 292 moves. In the illustrated embodiment, pivot member 244 includes a threaded bolt 246 that passes endwise through the hole 238 in the attachment portion 234 of each vane 292 and is threadably secured in the support member 272. Alternatively, bolt 246 can pass endwise through the support member 272 and through the aperture 238 defined in the corresponding vane 292 disposed on the opposite side of the support member 272 whereat a suitable nut 249 (FIG. 15) releasably holds the bolt 246 in place.

A fastener 250 is preferably used to releasably secure each vane 292 to the support 272. Notably, and as seen in FIG. 16, when the vane 292 is secured to the shank or support member 272, the lowermost portion of the leading edge 242 of the vane 292 is elevationally disposed above the point 294 on the shoe 290. In the illustrated embodiment, the threaded fastener 250 passes endwise through the slot 240 on the attachment portion 234 such that an upper working surface 243 of the blade portion 236 can be angularly disposed in several different positions relative to the top surface 200 of the shoe 290. Having once selected or predetermined angular relationship between the blade portion 236 of each vane 292 and the top surface 200 of the shoe 290, the fastener 250 is tightened to releasably fasten the vane 292 in an adjusted angular position relative to the support member or shank 272.

In one form, fastener 250 is a threaded bolt 252 that passes endwise through the slot 240 and is threadably fastened to the support member 272. Alternatively, bolt 252 can pass endwise through the support member 272 and through the slotted opening 240 defined in the corresponding vane 292 disposed on the opposite side of the support 272 whereat a suitable nut (not shown) releasably holds bolt 252 in place. As will be appreciated, the opposed ends of the slot 240 in each vane combines with the threaded bolt 252 to act as a stop for limiting the range of angular movement of the blade portion 236 of a respective vane to a predetermined range of travel. Notably, however, the vane is infinitely adjustable throughout the range of movement of the blade portion 236.

As will be appreciated by those skilled in the art, in addition to shattering of the hard pan area as the plow point assembly 274 is drawn through the ground, the downward slopping of each blade portion 236 has the further effect that the ground passing over the upper working surface 243 and adjacent to the inboard end of each vane 292 is twisted or lifted more than the ground lifted by the outboard edges of the blade portion 236 of each vane. The function and purpose of the downward slopping blade portion 236 is to additionally impart a twisting movement to the ground passing over the respective vane 292. To further promote shattering of the ground passing thereover, and as shown in FIGS. 17 and 18 a top or upper working surface 243 of the blade portion 236 of each vane 292 has a generally concave configuration in the longitudinal direction of the blade portion 236.

As shown in FIG. 3, a spring biased linkage assembly 310 is one apparatus for independently connecting the upper end 76 of each support or shank 72 to the tool bar assembly 16. The purpose of the linkage 310 is to normally maintain the subsoiler or ground penetrating unit 70 in an operational position while allowing vertical displacement of the ground penetrating unit 70 in response to abnormally high draft forces being applied thereto, i.e., when the shoe of the point assembly contacts or engages a subterranean rock or root. Preferably, linkage assembly 310 is similar to that disclosed in U.S. Pat. No. 3,321,027 to O. E. Johnson, et. al.; the entirety of which is incorporated herein by reference.

In the illustrated embodiment, the linkage assembly 310 includes upper and lower generally parallel links 312 and 314, respectively. Each link 312, 314 is pivotally connected to and disposed between the support member 72 and the tool bar assembly 16. Preferably, opposite ends of the upper and lower links 312 and 314 are pivotally connected to the support member 72 and tool bar assembly 16 such that the pivotal connections are arranged in a quadrilateral formation relative to each other. The upper and lower links 312 and 314, respectively, are of substantially similar length and thus preferably form a parallelogram type linkage.

In the illustrated embodiment, the upper link 312 comprises two toggle elements 318 and 320 that are connected proximate mid-length of the upper link 312 at a pivotal connection. The pivotal connection of the two toggle elements 318 and 320 is arranged slightly above a centerline passing between the pivotal connection of the upper link to the support member 72 and the pivotal connection of the upper link to the tool bar 16.

A spring mechanism 322 normally holds the toggle elements 318 and 320 of the upper link in non-collapsible relation relative to each other in the operating position of the ground penetrating unit 70 and inhibits floating movements of the plow point assembly 74 as it is drawn through the soil. The spring mechanism 322 does permit, however, the toggle elements 318 and 320 of the upper link 312 to move to a collapsed position relative to each other thereby allowing the ground penetrating unit 70 to move to a tripped position thus protecting the component parts thereof against breakage and damage upon engagement with a subterranean rock or root. It should be appreciated, a similar linkage assembly could likewise be used to operably connect each support member 272 to the tool bar assembly 16.

To protect the front edge or surface 82 of each shank or support 72 against wear, each ground penetrating unit 72 can further include a vertically elongated wear bar or member 330. The wear member or bar 330 extends along, generally parallel to and forwardly of the front edge 82 of each support in the direction of movement of the ground penetrating unit 70 through the field.

In the illustrated form of the invention, an upper end of wear bar or member 330 is preferably connected to the support 72 as with a suitable bracket 332. As shown in FIG. 3, a generally U-shaped bracket 333 is fitted about the lower end 80 of the support member 72 to position and hold the lower end of the wear bar 330. As shown in FIG. 20, bracket 333 is configured to embrace and extend upwardly along the sides 86 of and past the front edge 82 of the support member 72 to captively hold the wear member 330 between opposed side arms 334 and 335 thereof. As will be appreciated, other devices and methods could be used to position the wear bar 330 relative to the front surface or edge 82 of the support member 72 without detracting or departing from the spirit and scope of the present invention.

According to the present invention, the support member 72 of each ground penetrating unit can be attached or connected to the tool bar assembly in various ways. When the support member 72 of a respective ground penetrating unit is rigidly connected to the tool bar assembly, the support member 72 is preferably configured with a generally semi-parabolic shape between the upper and lower ends 76 and 80, respectively, thereof to advantageously arrange the plow point connected to the lower end thereof relative to the ground through which it is drawn to shatter the hard pan.

According to an alternative embodiment of the present invention, an upper end of one or more support members 72 of the ground penetrating units 70 can be connected to the tool bar assembly 16 as through the spring biased collapsible linkage assembly 310 discussed above. During the early development stages of the present invention, a problem was identified when the spring biased linkage assembly 310 was used to connect the support member 72 to the tool bar assembly 16 of the implement 10. That is, the spring biased linkage assembly 310 tended to allow the respective ground penetrating unit to "ride out" of the ground as the implement was drawn across the field.

One feature of the present invention specifically addresses and solves the problem associated with the spring biased linkage assembly 310 allowing the ground penetrating unit to "ride out" of the grounds as the implement is drawn across a field. According to the present invention, and as shown in FIG. 3, the configuration of the lower end 80 of the support member 72 combines and/or otherwise cooperates with the slanted outer top surface 100 of the shoe 90 such that an optimal included angle α is defined between the top surface 100 of the shoe 90 and the ground passing beneath the point 94 thereby inhibiting the ground penetrating unit from "riding out" of the ground as the implement is drown across the field.

Testing has shown that an optimal included angle ranging between about 31 degrees and about 35 degrees advantageously produces a downward force on the sharer point as the ground penetrating unit is drown through the ground. In a most preferred form of the invention, the configuration of the lower end 80 of the support member 72 combines with the top outer surface 100 on the shoe 90 such that an included angle of about 31.5 degrees is defined between the top surface 100 of the shoe 90 and the ground passing beneath the point 94.

As shown in FIGS. 6 and 7, and in addition to those features mentioned above, the blind recess 108 in the shoe 90 is provided with a top surface 110 that generally parallels the top outer surface 100 on the shoe 90. In the illustrated embodiment, that portion of the front face or edge 82 of the support member 72 extending over the lower portion 80 is disposed at an angle ranging between about 31 degrees and about 35 degrees relative to the ground surface that passes beneath the point 94 when the ground penetrating unit is drawn through the ground. Accordingly, in the illustrated embodiment, when shoe 90 is fastened to the lower end 80 of the support member 72, the inner top surface 110 of cavity 108 cooperates with the outer surface on the edge 82 to thereby maintain the top outer surface 100 of shoe 90 at an optimum included angle relative to the ground passing beneath the point 94 of the shoe 90. It should be appreciated, however, that configuring the inner top surface 110 of the cavity 108 and the surface 82 of support member 72 in the manner described above is but a single example of how the optimum angle α for the shoe 90 can be achieved but certainly should not be construed or interpreted as the only method or means for accomplishing the desired result.

During operation of the agricultural or farm implement 10, the ground penetrating units 70 are elevationally positioned relative to the ground surface as a function of the position of the gauge wheels 36, 38. As will be appreciated, if the driver 60 is linear distended an adequate amount, the gauge wheels 36, 38 position the tool bar assembly 16 such that each subsoiler unit, 70 is suspended above the ground surface.

Upon retraction of the driver 60, the gauge wheels 36, 38 are positioned to lower the ground penetrating units 70 into engagement with the ground surface. Continuous lowering of the tool bar assembly 16 as the implement moves forward will cause each plow point assembly 74 to cut into the soil until they reach a depth governed by the position of the gauge wheels 36 and 38. Due to the depth at which the plow point assembly 74 normally operates, the subsurface ground is fractured and broken but not vertically displaced substantially above the existing top surface of the ground. This has the advantage of breaking up the hard pan beneath the surface to increase its ability to absorb moisture while reducing erosion because the ground is not turned during the plowing operation. With a high moisture content, the large pieces of soil beneath the surface will, upon repeatedly freezing and thawing of winter, create an enhanced subsoil.

Since the plow point assemblies 74 and 274 and the component parts comprising each are substantially similar in structure and offer similar unique benefits, the operation of only plow point assembly 74 and the component parts thereof will be summarized. It will be appreciated, however, that plow point assembly is likewise considered beneficial and unique.

Independent attachment of the vanes 92 to the support member 72 allows the angular relationship of the blade portion 136 of each vane 92 to be independently and separately adjusted relative to the top surface 100 of the shoe 90. Thus, not only can the ground shattering area be increased by the transversely extending blade portions 136, but also the degree of shattering can be adjusted depending upon the angularity of the vanes 92 relative to the top surface 100 of the shoe 90 of each plow point assembly 74. In this regard, the surface configuration provided along the top working surface of the blade portions 136 of the vanes 92 also serves to enhance the ground shattering effect of the plow assembly. Attaching the vanes 92 independently to the support member 72 allows the vertical spacing or relationship between the vanes 92 and the shoe 90 to be modified or adjusted thereby allowing the plow point assembly to be customized to field conditions and the user's particular demands.

Independent attachment of the shoe 90 and each vane 92 to the support member 72 also promotes replacement of any one component rather than having to replace the entire plow point assembly 74. By maintaining all three independent components of the plow point assembly 74 in repair, the draft forces imparted to the tractor should be reduced thus enhancing performance of the implement and reducing energy consumption of the tractor 12.

The wear characteristics of the plow point assembly 74 are further enhanced by attaching the support member 72 to the tool bar assembly 16 with a collapsible linkage assembly 310. Because many rocks and roots are disposed subterraneously, they are not apparent to the operator as the agricultural or farm implement of the present invention is drawn across a field. When the plow point assembly 74 engages such subterranean rocks or roots, abnormally high draft forces are applied to the implement that often result in breakage or at least damage to the plow point assembly. With the present invention, however, the spring biased linkage assembly 310 allows the affected ground penetrating unit 70 to be vertically displaced, thus, minimizing the damage to the component parts thereof. After the obstruction passes, the spring biased linkage assembly 310 automatically returns the plow point assembly 74 to its operable position whereat it is disposed to shatter the hard pan as the implement 10 is drawn across the field.

Whether the support member 72 of each ground penetrating unit 70 is rigidly attached to the tool bar assembly 16 or is attached through a spring biased linkage assembly, such as 310, to the tool bar assembly 16 of the implement 10, the design of the support member 72 is such that the ground penetrating unit remains in the ground as the agricultural implement 10 is drawn across a field. In those embodiments where the support member 72 is rigidly attached to the tool bar assembly, the support member 72 is preferably configured to have a semi-parabolic shape between the upper end lower ends thereof.

In those embodiments wherein a spring biased linkage assembly, such as represented by reference numeral 310, is used to connect the support member 72 to the tool bar assembly, the lower end 80 of the support member 72 is configured to cooperate with the top outer surface 100 on the shoe 90 to form an optimum included and acute angle $\alpha$ between the outer top surface 100 and the ground passing beneath the point 94 ranging between about 31 degrees and about 35 degrees. In practice, it has been found that an included angle of about 31.5 degrees between the outer top surface 100 of the shoe 90 and the ground passing beneath the plow point 94 is beneficial.

As will be appreciated by those skilled in the art, the ground has a particularly wearing affect along the front ground engaging edge 82 of the support 72 as the each ground penetrating unit 70 is drawn through the soil. In this regard, it has been found to be beneficial to add a wear bar 330 in advance of and that parallels the front surface 82 of the support member 72.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A farm implement comprising:

a transversely elongated tool bar adapted for attachment behind an off-highway machine; and a plurality of ground penetrating units individually attached to the tool bar for performing a subsoiling operation, each ground penetrating unit comprising a generally vertical support member operably connected at an upper end to the tool bar in a manner permitting the ground penetrating unit to move along a fixed path of travel between an operating position and a tripped position and having a forwardly projecting lower end, with a plow point assembly releasably connected to the lower end of the support member, said plow point assembly comprising a shoe that is connected to the support member and a pair of vanes connected to opposite sides of the support member independently of each other and of said shoe, wherein said shoe releasably fits about and extends forwardly and downwardly from the lower end of said support member and has a transverse ground engaging point at its foremost end, a generally vertical surface at its rear end, an upwardly inclined top surface extending rearwardly from said point and forming an optimum angle of about 31 degrees to about 35 degrees relative to the ground surface passing beneath said point so as to facilitate reinsertion of the plow point assembly into the ground, and a bottom surface extending rearwardly from the ground engaging point, with said bottom surface having a relief extending thereacross and disposed rearwardly of said point for providing ground clearance as the ground penetrating unit is drawn through the ground, wherein each vane is releasably connected to the support member rearwardly of the rear surface of the shoe and such that each vane transversely diverges away from a respective side of the support member, with each vane including an attachment portion and a blade portion, said attachment portion being pivotally attached to the support member to allow for angular movement of the blade portion of each vane through a predetermined range of angular movement, and wherein said attachment portion further includes stops for limiting the range of angular movement of the blade portion of each vane, and a fastener for releasably securing the respective vane to the support member in an infinite number of positions throughout said range of angular movement thereby securing the blade portion at a selected angular orientation to impart a desired lifting force to the ground broken by said plow point assembly as the implement is drawn across a field.

2. The farm implement according to claim 1 wherein said support member has a pair of opposed generally flat transversely spaced upright sidewalls, a longitudinal concave downwardly sloping front wall, and a rear wall.

3. The farm implement according to claim 1 wherein said support member includes a front edge, and a wear member that generally parallels and is disposed forwardly of said front edge on said support member for inhibiting wear of the support member as the ground penetrating unit is drawn through the ground.

4. The farm implement according to claim 1 wherein said shoe is formed from white iron to enhance the wearability thereof.

5. The farm implement according to claim 1 wherein the attachment portion of each vane is apertured and extends generally vertical to abut with a generally planar side surface on said support member, and wherein the blade portion of each vane extends generally normal to and away from the attachment portion.

6. The farm implement according to claim 5 wherein a leading edge of the blade portion of each vane is swept back at an angle greater than 30° relative to a vertical plane disposed transverse to the direction said plow point assembly is drawn though the ground.

7. The farm implement according to claim 1 wherein the blade portion of each vane extends from a location adjacent to the support member to a location outward and downward thereof.

8. The farm implement according to claim 7 wherein a leading edge of the blade portion of each vane is swept back at an angle greater than 30° relative to a vertical plane disposed transverse to the direction said plow point assembly is drawn through the ground.

9. The farm implement according to claim 1 wherein said fastener passes through an elongated slotted aperture defined in the attachment portion of each vane.

10. A farm implement comprising:

a transversely elongated tool bar assembly adapted to be attached behind an off-highway machine; and a plurality of subsoiler units individually attached in predetermined transversely spaced relation relative to each other and to the tool bar assembly for performing subsoiling operations, each subsoiler unit comprising a depending support and a multi-piece plow point, with an upper end of said support being connected to the tool bar with a spring biased linkage assembly that maintains the subsoiler unit in an operational position beneath an upper surface of the soil through which the unit is pulled while allowing for vertical displacement of the plow point of a respective unit above the upper surface of the soil in response to abnormally high draft forces being applied thereto, said support further including a forwardly projecting lower end, with each plow point including a unitary shoe and two unitary vanes that are individually secured to the lower end of said support to readily allow replacement of the shoe or any vane of any plow point, said shoe being releasably secured to and surrounding a lengthwise portion of the lower end of said support and includes a ground breaking point having an upwardly sloping top surface extending rearwardly from said point and forming an angle of about 31 degrees to about 35 degrees relative to the ground surface passing beneath said point to promote reinsertion of the plow point into the ground from a a position above the upper surface of the soil, said top surface of the shoe terminating at a rear surface of said shoe, and wherein the vanes are disposed on opposite sides of each support rearwardly of the rear surface of said shoe, with each vane being attached to the support for pivotal movement about a generally horizontal axis through a predetermined range of angular movement, and with each vane including stops for limiting the movement of a respective vane through said range whereby allowing a blade portion of each vane to be angularly and independently positioned in an infinite number of positions through the predetermined range of movement between a relatively horizontal position and a angularly slanted position relative to the top surface of the ground through which said implement is being drawn, and a fastener for releasably and independently securing each vane to the support in a selectively adjusted angular position to effect a predetermined lifting force to broken ground passing over the blade portion of each plow point.

11. The farm implement according to claim 10 wherein said spring biased linkage assembly comprises at least upper and lower links pivotally connected to and disposed between the support and the tool bar, said links being arranged in generally parallel relationship relative to each other.

12. The farm implement according to claim 11 wherein said upper link of the linkage assembly is comprised of two interconnected linkages, and wherein said linkage assembly further includes a spring mechanism connected to the upper link for maintaining said plow point in ground engaging relation during operation of the farm implement.

13. The farm implement according to claim 10 wherein said support bar each plow point shoe includes a blind cavity opening to the rear surface of the shoe for endwise and releasably accommodating a distal end of the support.

14. The farm implement according to claim 10 wherein said support has a pair of transversely spaced generally flat vertical sidewalls that extend the length thereof, a longitudinal front wall, and a rear wall.

15. The farm implement according to claim 14 wherein said shoe further includes a bottom surface extending rearwardly from said ground breaking point and a pair of vertical outer side surfaces that are transversely spaced apart a greater distance than are the sidewalls of the support, said shoe further including a blind cavity that opens to the rear surface of the shoe and is defined by a pair of generally parallel inner surfaces that parallel the outer surfaces and are transversely spaced apart a distance about equal to the transverse spacing between the vertical sidewalls of the support, with the remainder of the cavity being configured to accommodate a lengthwise end portion of the support.

16. The farm implement according to claim 10 wherein said shoe is formed from white iron to enhance the wear characteristics thereof.

17. The farm implement according to claim 18 further including a vertically elongated bar connected to the support forwardly of and generally parallel to the longitudinal front wall of the support for inhibiting wear along the front wall of the support as the subsoiler unit is drawn through the ground.

18. The farm implement according to claim 10 wherein each vane further includes a generally vertical attachment portion, with the blade portion being connected to and extending outwardly and transversely away from the attachment portion.

19. The farm implement according to claim 18 wherein the attachment portion of each vane defines an aperture through which a threaded member passes and about which the blade portion angularly moves, said attachment portion further defining an elongated slot through which the fastener passes and which allows for pivotal movement of the vane between predetermined limits.

20. The farm implement according to claim 18 wherein the blade portion of each vane extends generally perpendicular relative to the attachment portion.

21. The farm implement according to claim 18 wherein the blade portion of each vane extends downwardly and outwardly away from the location that connects the blade portion and attachment portion.

22. The farm implement according to claim 10 wherein the top surface of said shoe has a changing surface configuration between said point and a rear surface of said shoe.

23. The farm implement according to claim 10 wherein the top surface of said shoe has a generally concave configuration-extending rearwardly from the point and a generally convex configuration extending forwardly from a war surface of the shoe.

24. The farm implement according to claim 10 wherein the blade portion of each vane extends downwardly from the inboard end of the vane.

* * * * *